US012544784B2

(12) United States Patent
Chung

(10) Patent No.: US 12,544,784 B2
(45) Date of Patent: Feb. 10, 2026

(54) SPRAY GUN FOR KITCHEN

(71) Applicant: Greatness Sanitary Industrial Co., Ltd, Changhua County (TW)

(72) Inventor: Min-Chih Chung, Changhua County (TW)

(73) Assignee: GREATNESS SANITARY INDUSTRIAL CO., LTD, Changhua County (TW)

( * ) Notice: Subject to any disclaimer, the term of this patent is extended or adjusted under 35 U.S.C. 154(b) by 244 days.

(21) Appl. No.: 18/424,654

(22) Filed: Jan. 26, 2024

(65) Prior Publication Data

US 2025/0242373 A1 Jul. 31, 2025

(51) Int. Cl.

| | |
|---|---|
| ***B05B 15/65*** | (2018.01) |
| ***B05B 1/12*** | (2006.01) |
| ***B05B 1/16*** | (2006.01) |
| ***B05B 1/18*** | (2006.01) |
| ***B05B 1/30*** | (2006.01) |
| ***B08B 3/02*** | (2006.01) |

(52) U.S. Cl.

CPC ................ *B05B 15/65* (2018.02); *B05B 1/12* (2013.01); *B05B 1/1609* (2013.01); *B05B 1/1681* (2013.01); *B05B 1/18* (2013.01); *B05B 1/3026* (2013.01); *B05B 1/3046* (2013.01); *B08B 3/02* (2013.01)

(58) Field of Classification Search

CPC .......... B05B 1/12; B05B 1/16; B05B 1/1609; B05B 1/1618; B05B 1/1681; B05B 1/18; B05B 1/3026; B05B 1/3046; B05B 15/65

See application file for complete search history.

(56) References Cited

U.S. PATENT DOCUMENTS

| | | | | |
|---|---|---|---|---|
| 6,234,192 | B1 * | 5/2001 | Esche | B65H 75/4478 251/114 |
| 2008/0223454 | A1 * | 9/2008 | Pilatowicz | E03C 1/08 137/455 |
| 2011/0272490 | A1 * | 11/2011 | Bosio | B05B 1/3013 239/436 |
| 2017/0335980 | A1 * | 11/2017 | Cutler | B05B 1/1618 |

* cited by examiner

*Primary Examiner* — Scott J Walthour

(74) *Attorney, Agent, or Firm* — LANWAY IPR SERVICES; Chun-Ming Shih

(57) ABSTRACT

A spray gun for a kitchen contains: a connector, a body, a spraying element, an adjustor, and a casing. The connector includes a conduit, an inlet, and an outlet. The body includes a guiding channel, a press bar, a control bolt, and a spring. The spraying element includes a fixer, a valve core, a fitting ring, a first water supply unit, and a second water supply unit. The fixer has a switch groove. The fitting ring has a first watering path and a second watering path. The adjustor includes an adjusting stem. The casing is fitted on the spraying element, and a distal end of the casing is connected on the adjustor so as to move the casing forward or backward to switch the adjusting stem of the adjustor on the switch groove. In addition, the switch groove has a first position and a second position.

3 Claims, 11 Drawing Sheets

SPRAY GUN FOR KITCHEN

TECHNICAL FIELD

The present invention relates to cleaning equipment, and more particularly to a spray gun for a kitchen which is capable of spraying tap water in a water jet mode stably.

BACKGROUND

A conventional spray gun is connected with a faucet in a kitchen to wash tableware and a water sink. As shown in FIG. 1, a faucet holder 11 includes a switch bar 12 connected on a peripheral side thereof, an outlet 13 defined on a top of the faucet holder 11, a water supply tube 14 connected with the outlet 13, a spray head 15 fixed on an end of the water supply tube 14 opposite to the outlet 13, a press stem 16 connected on the spray head 15, and a spraying nozzle element 17 fixed on an end of the spray head 15 opposite to the water supply tube 14, such that the press stem 16 is pressed to actuate tap water to flow out of the spraying nozzle element 17 via the spray head 15, thus cleaning the tableware or the water sink in a water jet mode.

However, the conventional spray gun cleans the tableware or the water sink in a fixed water flow, it is difficult to flush residue on the tableware or the water sink cleanly.

The present invention has arisen to mitigate and/or obviate the afore-described disadvantages.

SUMMARY

The primary aspect of the present invention is to provide a spray gun for a kitchen which is capable of supplying tap water in a water jet mode or a water shower mode based on cleaning requirements to enhance cleaning efficiency and quality in the kitchen.

To obtain above-mentioned aspect, a spray gun for a kitchen provided by the present invention contains: a connector, a body, a spraying element, an adjustor, and a casing.

A first end of the connector is connected with a water supply tube, and the connector includes a conduit formed on a central section thereof, an inlet defined between the first end of the connector and the conduit, and an outlet formed on a second end of the connector.

The body is formed in a T shape and is fixed in front of the second end of the connector, and the body includes a guiding channel defined thereof and communicating with the outlet, such that tap water is guided to flow toward the spraying element via the guiding channel. The body further includes a press bar, a control bolt, and a spring. The press bar is connected on an outer wall of the body, the control bolt is received in the body and is configured to control an open or a close of the guiding channel, and the spring is connected on a lower end of the control bolt so that the control bolt is configured to maintain the close of the guiding channel normally.

The spraying element is fitted onto a front end of the body, and the spraying element includes a fixer, a valve core, a fitting ring, a first water supply unit, and a second water supply unit. The fixer is disposed on the front end of the body and has a switch groove formed on an outer wall of the fixer, the valve core is fixed in the fitting ring and is connected with the fixer via the casing, and the fitting ring has a first watering path and a second watering path. The first water supply unit is mounted on a center of a front end of the fitting ring and is configured to supply the tap water by matching with the first watering path, and the second water supply unit is disposed on the front end of the fitting ring and is configured to supply the tap water by matching with the second watering path.

The adjustor is disposed between the body and the spraying element and is formed in a ring shape. The adjustor includes an adjusting stem which is connected with the valve core via the fixer to actuate the valve core to move in the fixer.

The casing is fitted on an outer wall of the spraying element, and a distal end of the casing is connected on the adjustor so as to move the casing forward or backward to switch the adjusting stem of the adjustor on the switch groove. The switch groove has a first position and a second position.

When the casing is pulled to move toward the body, the adjusting stem is located at the first position of the switch groove, and the spraying element is pushed forward with respect to the casing to adjust the adjustor finely, such that the adjusting stem is located at the first position, and the valve core stops the second watering path, thereafter the press bar is pressed so that the control bolt descends to open the guiding channel and the tap water flows to the spraying element from the connector, then the tap water further flows to the first water supply unit via the first watering path of the fitting ring to supply the tap water in a water jet mode.

When the casing is pulled to move away from the body, the adjusting stem is located at the second position of the switch groove, and the spraying element is moved to retract into the casing, then the adjustor is adjusted finely so that the adjusting stem is located at the second position, hence the valve core stops the first watering path of the fitting ring, and the press bar is pressed to descend the control bolt so that the guiding channel is opened to flow the tap water toward the spraying element via the connector, then the tap water further flows to the second water supply unit via the second watering path of the fitting ring to supply the tap water in a water shower mode.

Preferably, the connector is comprised of a holder and an extending rod.

Preferably, the body includes a cap mounted on a bottom thereof and configured to connect the control bolt and the spring and to clean an interior of the body.

Thereby, the spray gun has advantages as follows:

1) The casing is moved to position the spraying element at the first position or the second position so as to switch the spray gun to supply the tap water. For example, when the tap the adjusting stem is located at the first position, the first water supply unit supplies the tap water in the water jet mode. When the adjusting stem is located at the second position, the second water supply unit of the spraying element supplies the tap water in the water shower state, thus cleaning the kitchen effectively.

2) The spray gun is moved above to the desired washing object (such as the tableware) or place (such as the water sink) by using the length of the extending rod of the connector, thus obtaining an outstanding cleaning effect.

3) The cap is removable to clean the interior of the body, thus avoiding avoid the accumulation/block of incrustant.

DETAILED DESCRIPTION

Figure 1:
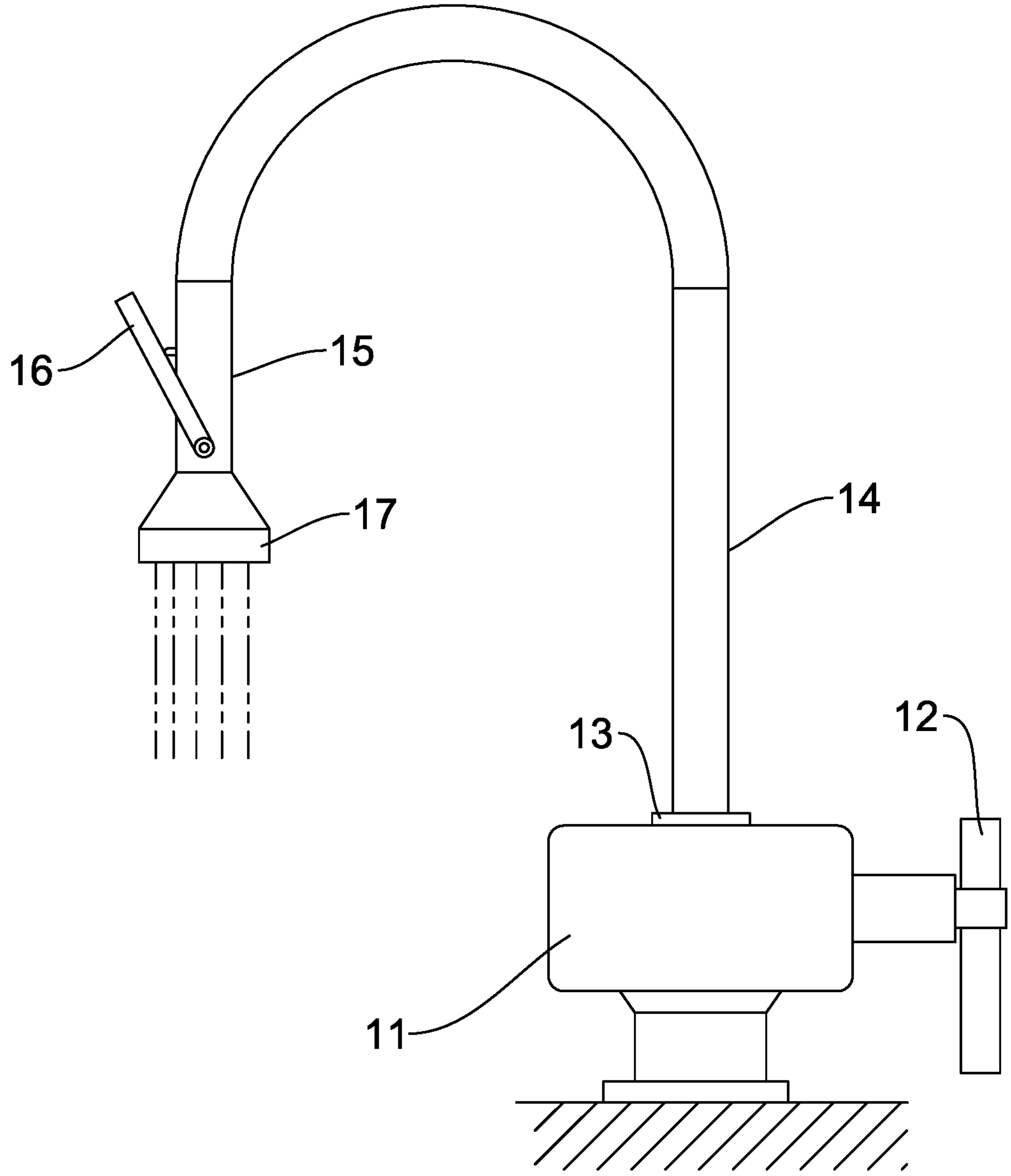
PRIOR ART FIG.1
FIG. 1 is a side plan view showing a conventional spray gun for a kitchen.
Figure 2:
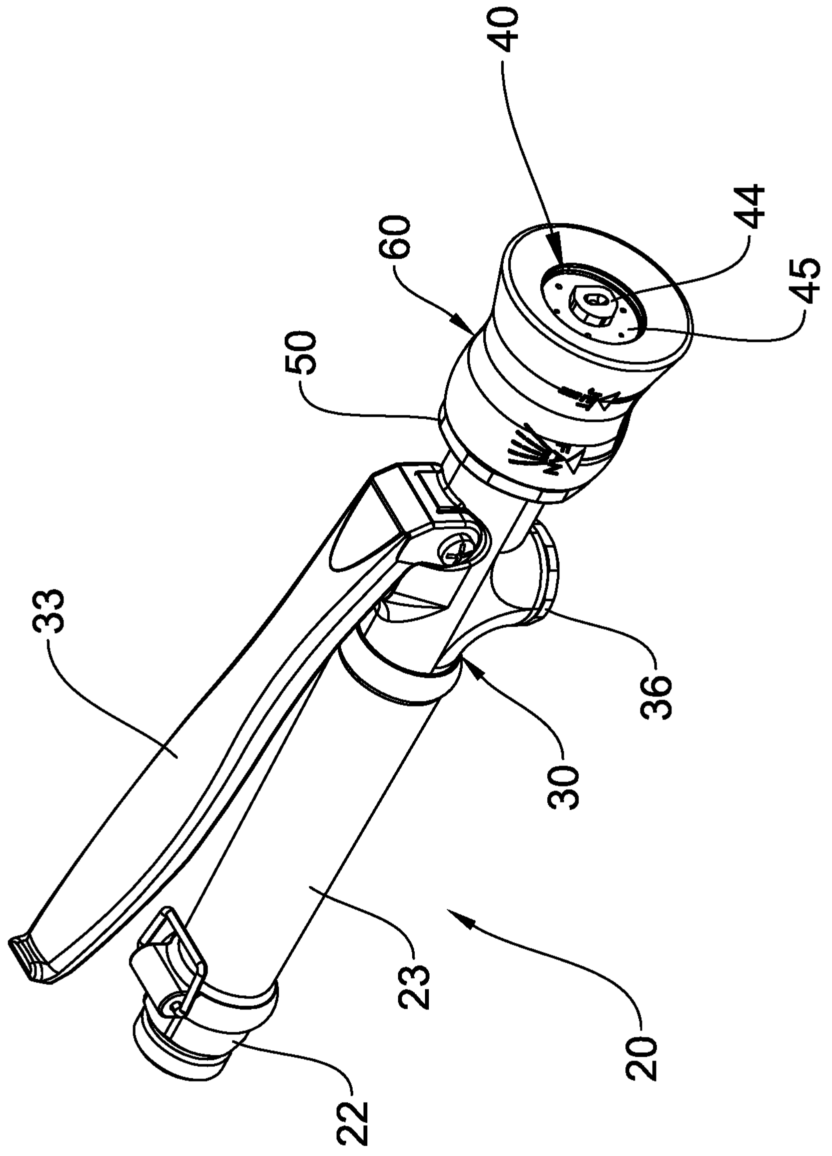
FIG. 2 is a perspective view showing the assembly of a spray gun for a kitchen according to a preferred embodiment of the present invention.
Figure 3:
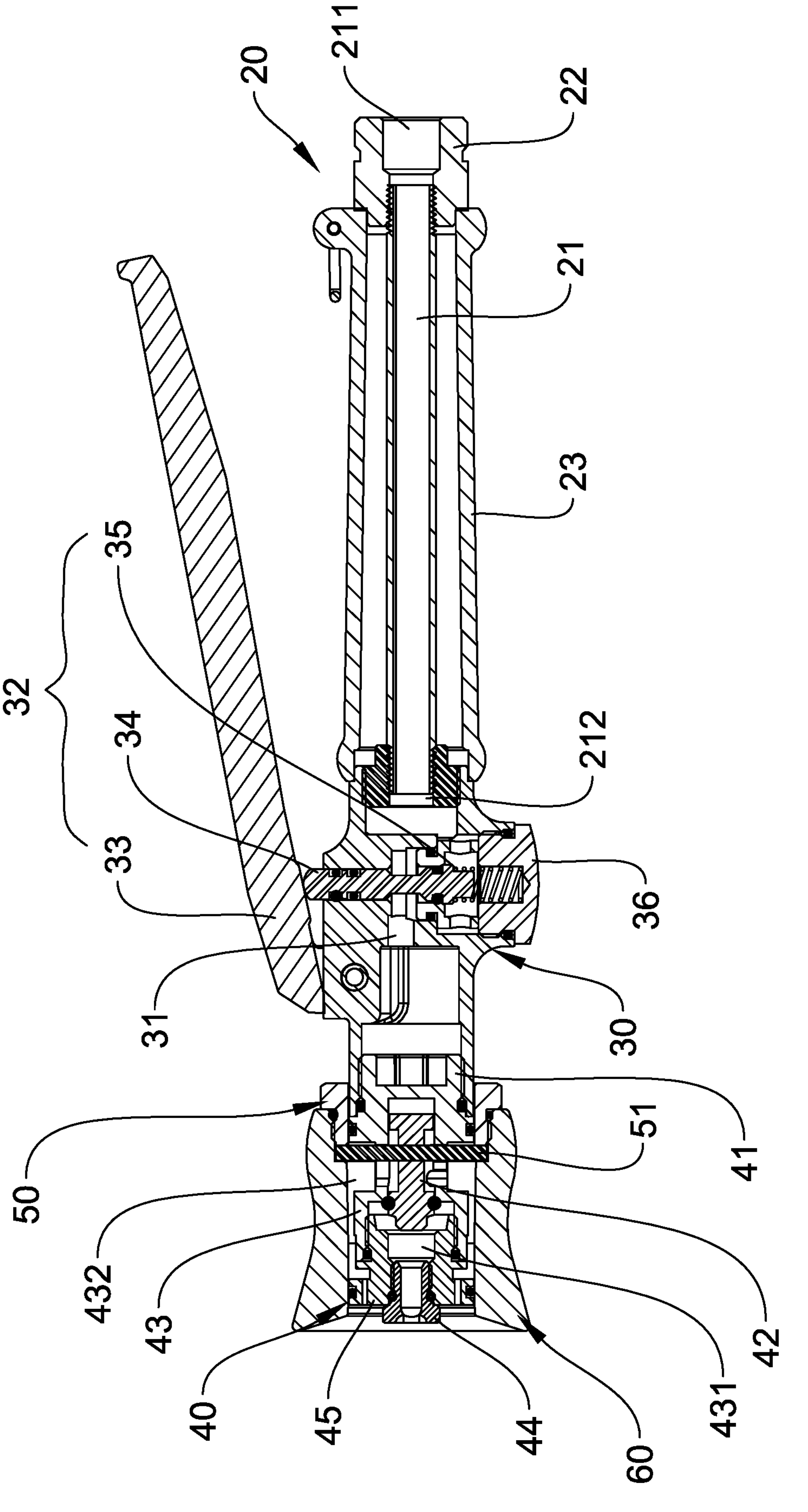
FIG. 3 is a cross sectional view showing the assembly of the spray gun for the kitchen according to the preferred embodiment of the present invention.
Figure 7:
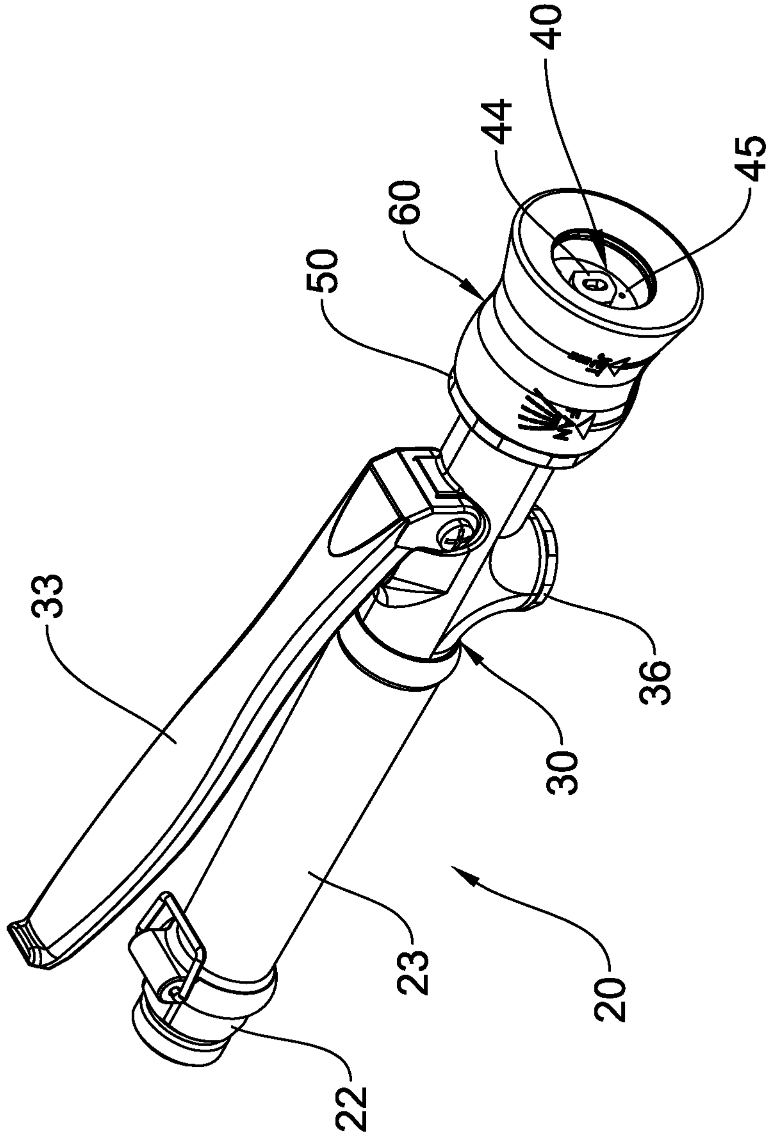
FIG. 7 is another perspective view showing the assembly of the spray gun for the kitchen according to the preferred embodiment of the present invention.
Figure 8:
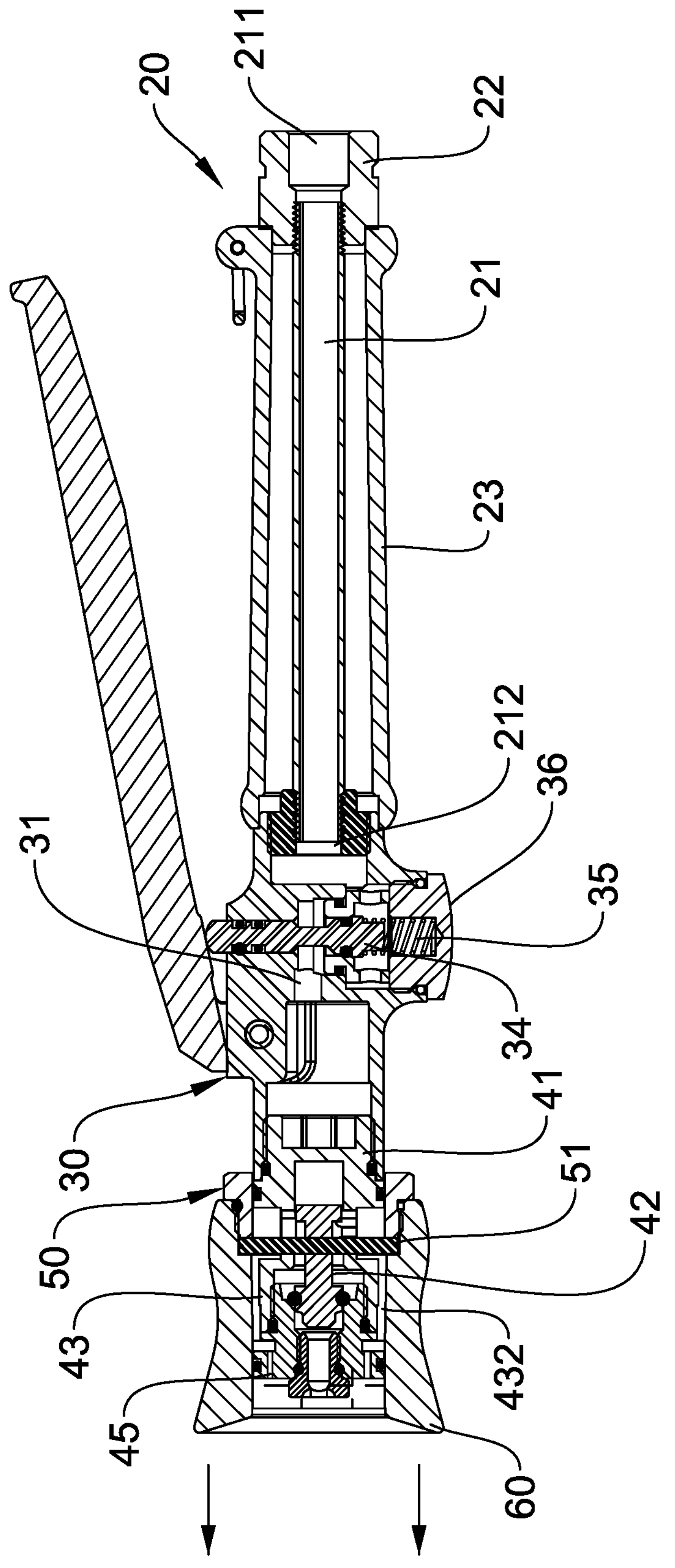
FIG. 8 is a cross sectional view showing the operation of FIG. 6.

With reference to FIGS. 2, 3 and 7, a spray gun for a kitchen according to a preferred embodiment of the present invention comprises: a connector 20, a body 30, a spraying element 40, an adjustor 50, and a casing 60.

Referring to FIGS. 2, 3 and 7, a first end of the connector 20 is connected with a water supply tube (not shown), and the connector 20 includes a conduit 21 formed on a central section thereof, an inlet 211 defined between the first end of the connector 20 and the conduit 21, and an outlet 212 formed on a second end of the connector 20. To enhance cleaning efficiency and extend a cleaning position, the connector 20 is comprised of a holder 22 and an extending rod 23 so that the spray gun is moved above to a desired washing object/place by using a length of the extending rod 23.

Referring to FIGS. 2, 3 and 7, the body 30 is formed in a T shape and is fixed in front of the second end of the connector 20, and the body 30 includes a guiding channel 31 defined thereof and communicating with the outlet 212, such that tap water is guided to flow to the spraying element 40 via the guiding channel 31. The body 30 includes a press bar 33, a control bolt 34, and a spring 35, wherein the press bar 33 is connected on an outer wall of the body 30, the control bolt 34 is received in the body 30 and is configured to control an open or a close of the guiding channel 31, the spring 35 is connected on a lower end of the control bolt 34 so that the control bolt 34 is configured to maintain the close of the guiding channel 31. To clean an interior of the body 30 and avoid an accumulation/block of incrustant, the body 30 includes a cap 36 mounted on a bottom of the body 30 and configured to connect the control bolt 34 and the spring 35 and to clean the interior of the body 30.

As shown in FIGS. 3-5 and 8-10, the spraying element 40 is fitted onto a front end of the body 30, and the spraying element 40 includes a fixer 41, a valve core 42, a fitting ring 43, a first water supply unit 44, and a second water supply unit 45. The fixer 41 is disposed on the front end of the body 30 and has a switch groove 411 formed on an outer wall of the fixer 41, the valve core 42 is fixed in the fitting ring 43 and is connected with the fixer 41 via the casing 60, and the fitting ring 43 has a first watering path 431 and a second watering path 432. The first water supply unit 44 is mounted on a center of a front end of the fitting ring 43 and is configured to supply the tap water by matching with the first watering path 431, and the second water supply unit 45 is disposed on the front end of the fitting ring 43 surrounding the first water supply unit 44 and is configured to supply the tap water by matching with the second watering path 432.

Figure 4:
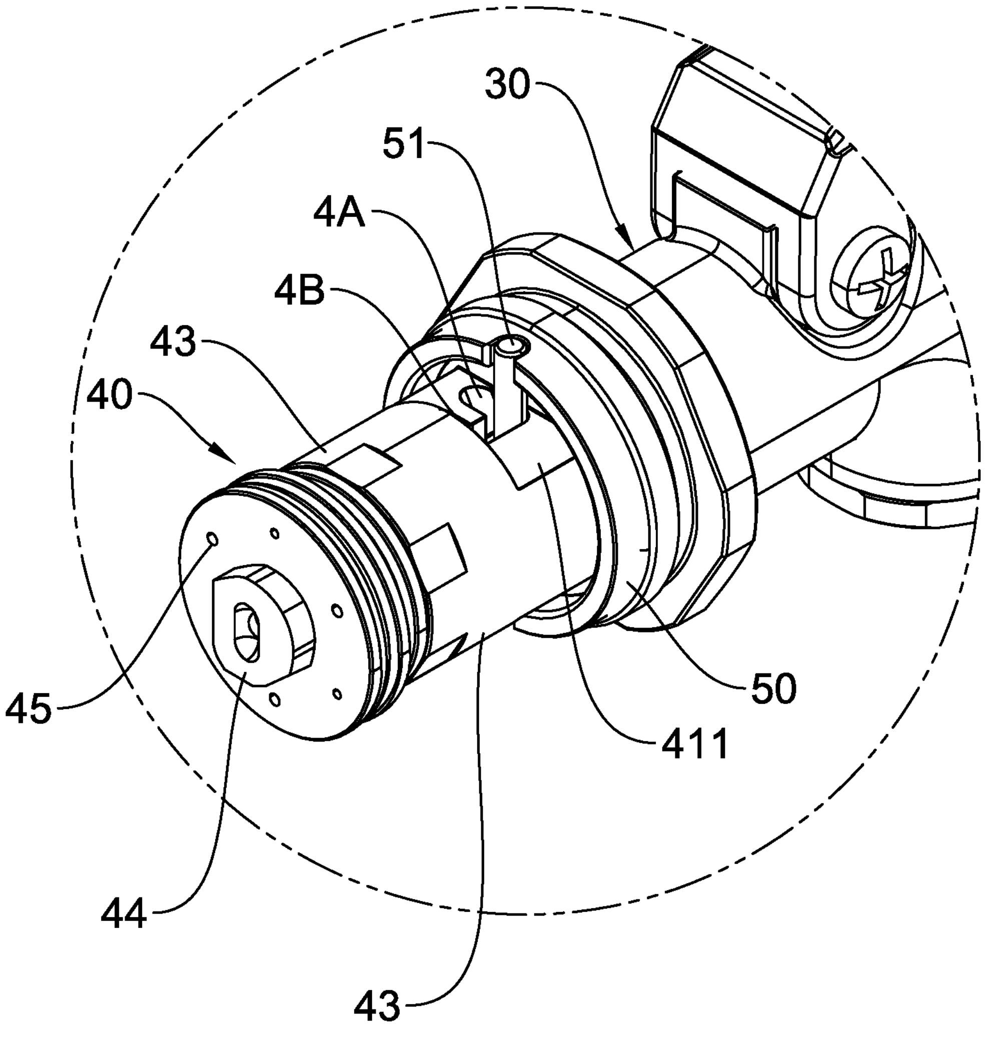
FIG. 4 is a perspective view showing the assembly of a part of the spray gun for the kitchen according to the preferred embodiment of the present invention.
Figure 5:
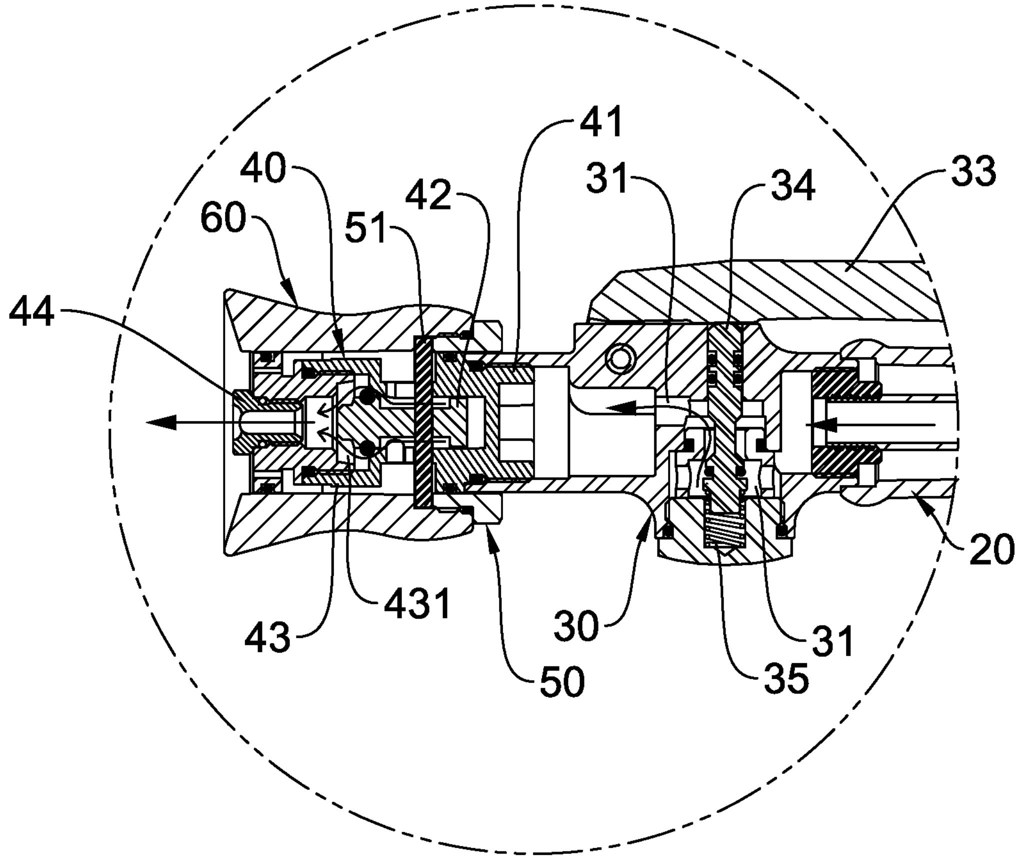
FIG. 5 is a cross sectional view showing the operation of a first water supply unit of the spray gun for the kitchen according to the preferred embodiment of the present invention.
Figure 9:
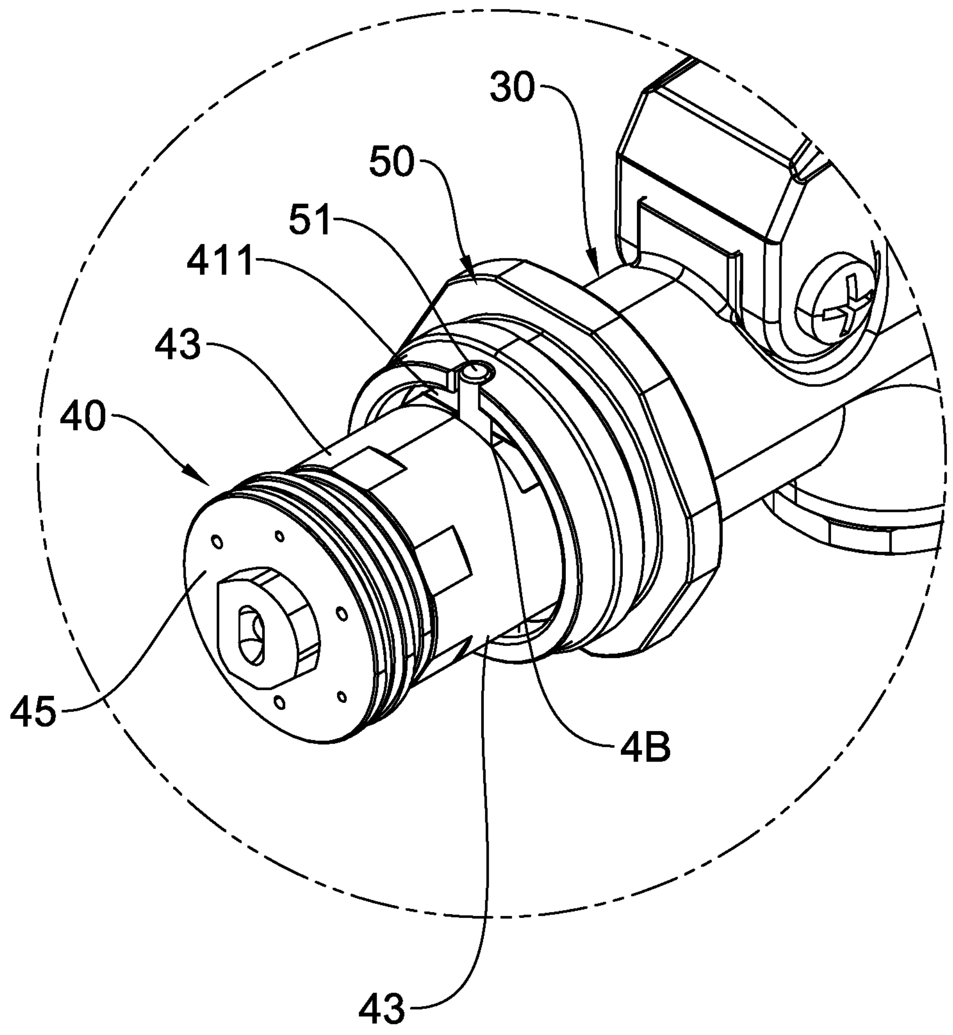
FIG. 9 is another perspective view showing the assembly of a part of the spray gun for the kitchen according to the preferred embodiment of the present invention.

With reference to FIGS. 2-10, the adjustor 50 is disposed between the body 30 and the spraying element 40 and is formed in a ring shape, wherein the adjustor 50 includes an adjusting stem 51, and the switch groove 411 has a first position 4A and a second position 4B. Referring to FIGS. 5 and 9, the adjusting stem 51 is connected with the valve core 42 via the fixer 41 to actuate the valve core 42 to move in the fixer 41.

As shown in FIGS. 2-10, the casing 60 is fitted on an outer wall of the spraying element 40, and a distal end of the casing 60 is connected on the adjustor 50 so as to move the casing 60 forward or backward to switch the adjusting stem 51 of the adjustor 50 on the switch groove 411 and to actuate the valve core 42 to flow the tap water from a water faucet (not shown) via the first water supply unit 44 or the second water supply unit 45.

Figure 6:
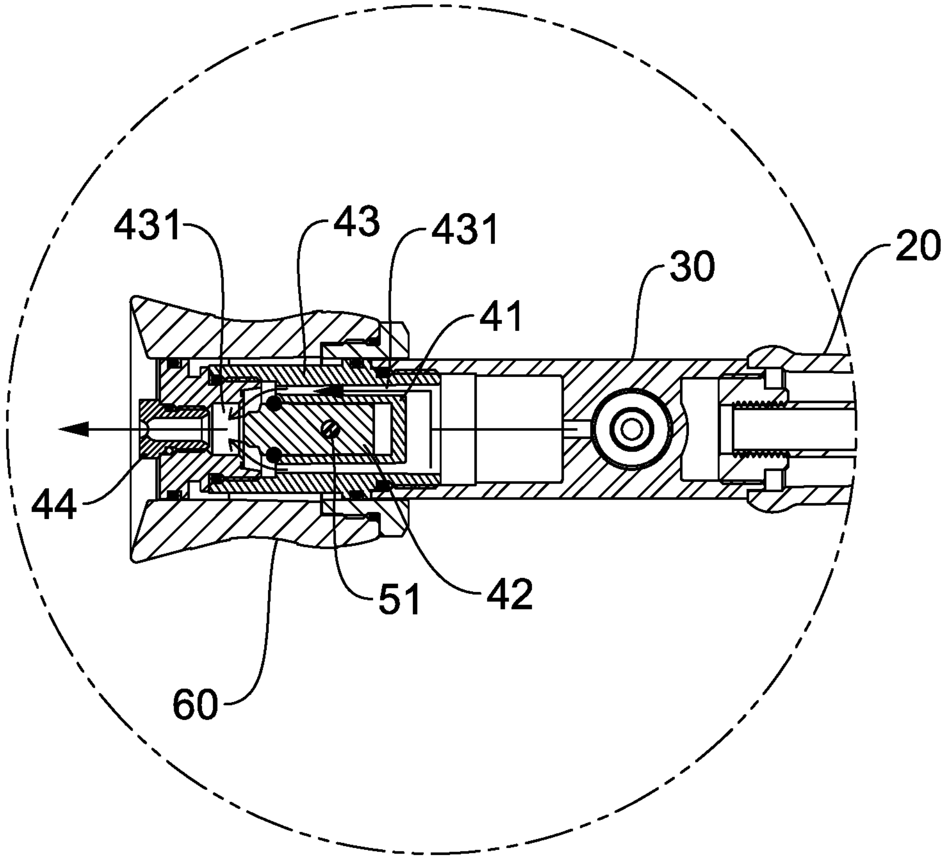
FIG. 6 is a cross sectional view of a part of FIG. 5.

As illustrated in FIGS. 4-6, in operation, for example, as desiring to clean residue on a tableware or a water sink, the casing 60 is pulled to move toward the body 30 so that the adjusting stem 51 is located at the first position 4A of the switch groove 411, and the spraying element 40 is pushed forward with respect to the casing 60 to adjust the adjustor 50 finely, such that the adjusting stem 51 is located at the first position 4A, and the valve core 42 stops the second watering path 432. Thereafter, the press bar 33 is pressed so that the control bolt 43 descends to open the guiding channel 31 and the tap water flows to the spraying element 40 from the connector 20, then the tap water further flows to the first water supply unit 44 via the first watering path 431 of the fitting ring 43 to supply the tap water in a water jet mode, hence the tap water is collected to produce a strong washing effect, thus cleaning the residue in the water jet mode.

Figure 10:
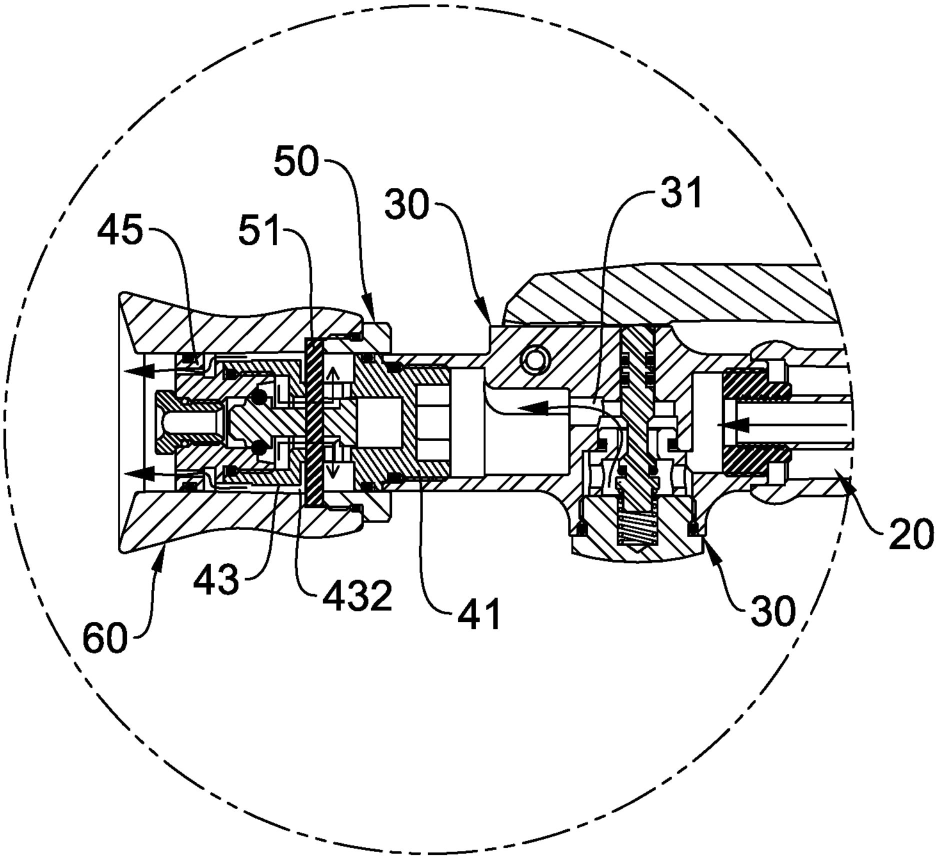
FIG. 10 is a cross sectional view showing the operation of a second water supply unit of the spray gun for the kitchen according to the preferred embodiment of the present invention.
Figure 11:
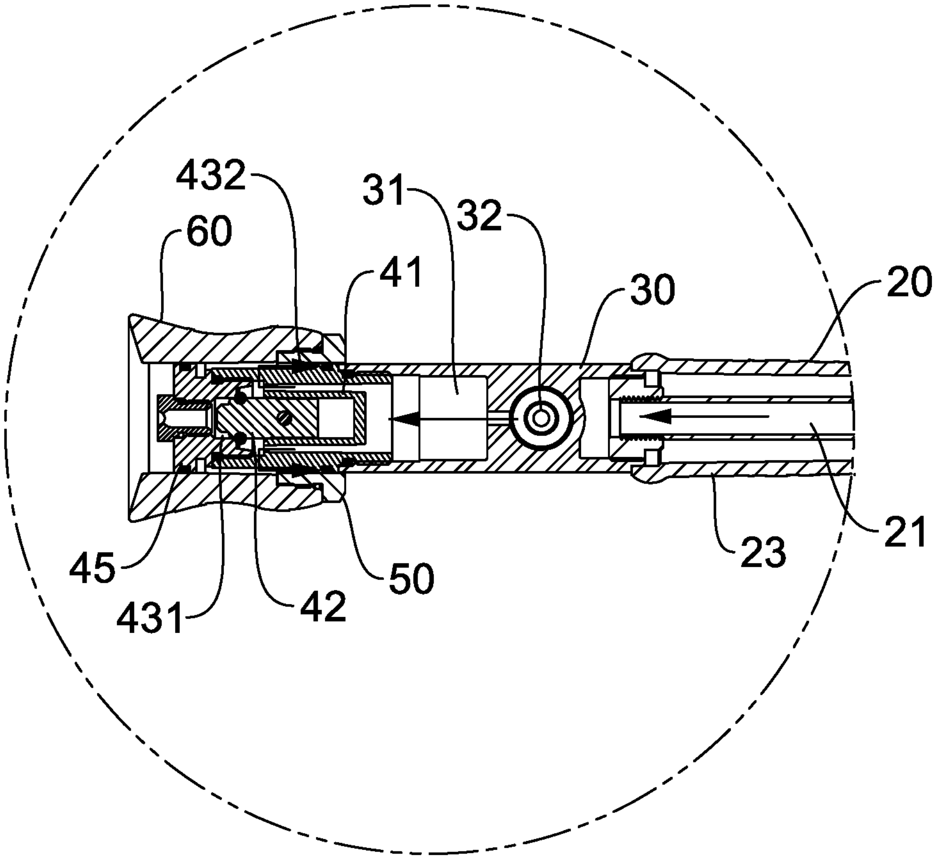
FIG. 11 is a cross sectional view of a part of FIG. 10.

With reference to FIGS. 9-11, when desiring to clean in a large area, the casing 60 is pulled to move away from the body 30 so that the adjusting stem 51 is located at the second position 4B of the switch groove 411, and the spraying element 40 is moved to retract into the casing 60, then the adjustor 50 is adjusted finely so that the adjusting stem 51 is located at the second position 4B, as shown in FIG. 11, wherein the valve core 42 stops the first watering path 431 of the fitting ring 43, as illustrated in FIGS. 9-11, and the press bar 33 is pressed to descend the control bolt 34 so that the guiding channel 31 is opened to flow the tap water toward the spraying element 40 via the connector 20, then the tap water further flows to the second water supply unit 45 via the second watering path 432 of the fitting ring 43 to supply the tap water in a water shower mode, hence the tap water is collected to produce the strong washing effect, thus cleaning the residue in the water shower mode, thus cleaning the tableware or the water sink efficiently.

Accordingly, the spray gun has advantages as follows:

1) The casing 60 is moved to position the spraying element 40 at the first position 4A or the second position 4B so as to switch the spray gun to supply the tap water, for example, when the tap the adjusting stem 51 is located at the first position 4A, the first water supply unit 44 supplies the tap water in the water jet mode. When the adjusting stem 51 is located at the second position 4B, the second water supply unit 45 of the spraying element 40 supplies the tap water in the water shower state, thus cleaning the kitchen effectively.

2) The spray gun is moved above to the desired washing object (such as the tableware) or place (such as the water sink) by using the length of the extending rod 23 of the connector 20, thus obtaining an outstanding cleaning effect.

3) The cap 36 is removable to clean the interior of the body 30, thus avoiding avoid the accumulation/block of incrustant.

4) To prevent a water leakage, at least one O ring is fixed on any components of the spray gun. Since the at least one O ring is a well-known art, further remarks are omitted.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A spray gun for a kitchen comprising: a connector, a body, a spraying element, an adjustor, and a casing;

wherein a first end of the connector is connected with a water supply tube, and the connector includes a conduit formed on a central section thereof, an inlet defined between the first end of the connector and the conduit, and an outlet formed on a second end of the connector;

wherein the body is formed in a T shape and is fixed in front of the second end of the connector, and the body includes a guiding channel defined therein and communicating with the outlet, such that tap water is guided to flow toward the spraying element via the guiding channel; the body further includes a press bar, a control bolt, and a spring, wherein the press bar is connected on an outer wall of the body, the control bolt is received in the body and is configured to control opening and closing of the guiding channel, and the spring is connected on a lower end of the control bolt to bias the control bolt to close the guiding channel;

wherein the spraying element is fitted onto a front end of the body, and the spraying element includes a fixer, a valve core, a fitting ring, a first water supply unit, and a second water supply unit, wherein the fixer is disposed on the front end of the body and has a switch groove formed on an outer wall of the fixer, the valve core is fixed in the fitting ring and is connected with the fixer via the casing, and the fitting ring has a first watering path and a second watering path; wherein the first water supply unit is mounted on a center of a front end of the fitting ring and is configured to supply the tap water by matching with the first watering path, and the second water supply unit is disposed on the front end of the fitting ring and is configured to supply the tap water by matching with the second watering path; wherein the adjustor is disposed between the body and the spraying element and is formed in a ring shape, wherein the adjustor includes an adjusting stem which is connected with the valve core via the fixer to actuate the valve core to move in the fixer;

wherein the casing is fitted on an outer wall of the spraying element, and a distal end of the casing is connected on the adjustor so as to move the casing forward or backward to switch the adjusting stem of the adjustor on the switch groove; wherein the switch groove has a first position and a second position;

wherein when the casing is pulled to move toward the body, the adjusting stem is located at the first position of the switch groove, and the spraying element is pushed forward with respect to the casing to move the adjustor, such that the adjusting stem is located at the first position, and the valve core stops the second watering path, thereafter the press bar is pressed so that the control bolt descends to open the guiding channel and the tap water flows to the spraying element from the connector, then the tap water further flows to the first water supply unit via the first watering path of the fitting ring to supply the tap water in a water jet mode; and wherein when the casing is pulled to move away from the body, the adjusting stem is located at the second position of the switch groove, and the spraying element is moved to retract into the casing, then the adjustor is moved so that the adjusting stem is located at the second position, hence the valve core stops the first watering path of the fitting ring, and the press bar is pressed to descend the control bolt so that the guiding channel is opened to flow the tap water toward the spraying element via the connector, then the tap water further flows to the second water supply unit via the second watering path of the fitting ring to supply the tap water in a water shower mode.

2. The spray gun as claimed in claim 1, wherein the connector is comprised of a holder and an extending rod.

3. The spray gun as claimed in claim 1, wherein the body includes a cap mounted on a bottom thereof and configured to connect the control bolt and the spring and to seal an interior of the body.

* * * * *